US005481763A

United States Patent [19]

Brostrom et al.

[11] Patent Number: 5,481,763

[45] Date of Patent: Jan. 9, 1996

[54] MOLDED HEAD HARNESS

[75] Inventors: Gerald M. Brostrom, Burnsville, Minn.; David C. Byram, River Falls, Wis.

[73] Assignee: Minnesota Mining and Manufacturing Company, St. Paul, Minn.

[21] Appl. No.: 350,793

[22] Filed: Dec. 7, 1994

Related U.S. Application Data

[62] Division of Ser. No. 10,546, Jan. 28, 1993, Pat. No. 5,394, 568.

[51] Int. Cl.$^{6}$ .............................. A62B 18/08; B29D 5/00

[52] U.S. Cl. .............................. 2/452; 2/9; 128/207.11; 264/252

[58] Field of Search .............................. 2/9, 11, 452, 173, 2/181, 209.13, 410, 424; 128/201.22, 201.23, 201.24, 201.25, 201.29, 206.12, 206.24, 206.27, 206.28, 207.11; 264/252, 275, 279.1

[56] References Cited

U.S. PATENT DOCUMENTS

| | | | |
|---|---|---|---|
| 1,395,761 | 11/1921 | Monro et al. | 128/207.11 |
| 1,942,442 | 1/1934 | Motsinger | 2/9 |
| 2,199,690 | 5/1940 | Bullard | 128/207.11 |
| 3,457,564 | 7/1969 | Holloway | 2/8 |
| 3,624,663 | 11/1971 | Jones | 128/201.23 |
| 4,494,538 | 1/1985 | Ansite | 128/205.25 |
| 4,534,344 | 8/1985 | Constance-Hughes | 128/201.19 |
| 4,595,003 | 6/1986 | Shoemaker et al. | 128/201.19 |
| 4,910,806 | 3/1990 | Baker et al. | 2/452 |
| 5,038,776 | 8/1991 | Harrison et al. | 128/207.11 |
| 5,052,084 | 10/1991 | Braun | 128/206.27 |
| 5,062,421 | 11/1991 | Burns et al. | 128/205.27 |
| 5,067,174 | 11/1991 | Richey et al. | 2/9 |
| 5,069,205 | 12/1991 | Urso | 128/201.24 |

FOREIGN PATENT DOCUMENTS

| | | |
|---|---|---|
| 0464342 | 1/1992 | European Pat. Off. . |
| 825960 | 12/1937 | France . |
| 950429 | 10/1956 | Germany . |
| 220052 | 8/1942 | Switzerland . |
| 377926 | 8/1932 | United Kingdom . |

*Primary Examiner*—Clifford D. Crowder
*Assistant Examiner*—Michael A. Neas
*Attorney, Agent, or Firm*—Gary L. Griswold; Walter N. Kirn; Carole Truesdale

[57] ABSTRACT

An insert-molded head harness for use in securing a respirator mask to the face of a wearer, wherein the head harness comprises a web having a central portion and a peripheral portion extending at least partially around the central portion, and a plurality of elastomeric fastening straps having first and second ends, the first ends being integrally bonded to the peripheral portion of the web and the second ends being adapted to be used in securing a respirator mask to the face of a wearer. The head harness can include an elastomeric flange which comprises an elastomeric resin and embeds the peripheral portion of the web. The web preferably comprises a material selected from the group consisting of woven, knitted, and non-woven materials.

9 Claims, 2 Drawing Sheets

MOLDED HEAD HARNESS

This is a division of application Ser. No. 08/010,546 filed Jan. 28, 1993, now U.S. Pat. No. 5,394,565.

FIELD OF THE INVENTION

The invention relates to a head harness for use in securing a respirator mask to the face of a wearer, a respirator mask assembly comprising such a head harness, and a process for making such a head harness.

BACKGROUND OF THE INVENTION

Various designs of head harnesses have been utilized in the prior art for maintaining a respirator mask on a wearer's face. A conventional respirator mask construction includes a rigid facepiece and a flexible face seal supported by the facepiece. A rigid facepiece may include a rigid lens, a rigid shell, or both. The desirability of having a head harness that can be placed over the wearer's head without becoming entangled with the wearer's hair is recognized in the art. Of course, it is also considered desirable to have a face mask that can be worn without undue discomfort.

A commonly used head harness for respirator masks is a multi-layered pad of textile fabric material that seats on the back of a wearer's head and has several adjustable elastomer or elastic straps projecting from the pad to the perimeter of the respirator mask. Such a head harness typically may include two similarly shaped layers of fabric sewn together about their peripheries to form a pad and fastening straps having first ends disposed between the two fabric layers and sewn in place, the straps extending outwardly from the pad for the purpose of securing a respirator mask to the face of a wearer. Although this head harness construction is not complex, it requires that the fastening straps be sewn to the pad. It would be desirable from an economic standpoint to eliminate the necessity for sewing the fastening straps to the pad.

SUMMARY OF THE INVENTION

The invention provides a molded head harness which is adapted to be used in securing a respirator mask to the face of a wearer.

It is believed that the molded head harness of the invention can be manufactured at substantially less cost than prior art head harnesses for respirator masks while providing at least comparable comfort to the wearer during use as well as an exceptionally strong construction.

In brief summary, the head harness provided herein comprises a molded head harness comprising a plurality of elastomeric fastening straps and a web having a central portion and a peripheral portion extending at least partially, and preferably substantially completely, around the central portion. The term "peripheral portion" is intended to denote any portion of the web which is to be contacted by molten resin during the molding process used in making the head harness. Each of the elastomeric fastening straps has first and second ends, with the first end being integrally bonded to the peripheral portion of the web and the second end being adapted to be used in securing a respirator mask to the face of a wearer.

The head harness preferably also comprises an elastomeric flange comprising an elastomeric resin, wherein the peripheral portion of the web is embedded in the elastomeric resin to thereby integrally bond the elastomeric flange to the web. If the head harness includes such an elastomeric flange, the first ends of the elastomeric fastening straps are integrally bonded to the peripheral portion of the web through an integral bonding of the first ends of the elastomeric straps to the elastomeric flange.

Typically, the web comprises a woven, knitted, or non-woven material, and the elastomeric resin of the elastomeric flange encapsulates or embeds this material to form a strong integral mechanical connection. The preferred elastomeric resin is a styrene-butadiene-styrene block copolymer.

The invention also provides a method for making such a head harness. Briefly summarizing, this method comprises the steps of:

a) inserting a moldable web into a mold, the web comprising a central portion and a peripheral portion extending at least partially around the central portion, the mold being adapted to receive the web as an insert and having a mold cavity shaped to permit the molding of a plurality of elastomeric fastening straps formed integrally with the peripheral portion of the web;

b) positioning and securing the web within the mold so that the peripheral portion of the web can extend into the mold cavity during the molding process;

c) clamping the blocks of the mold together at a suitable clamping pressure to thereby clamp the central portion of the web;

d) contacting the peripheral portion of the web with a molten elastomeric resin in a quantity sufficient to embed the peripheral portion of the web in the molten resin and form a plurality of elastomeric fastening straps which are integral with the peripheral portion of the web;

e) maintaining suitable pressure and temperature in the mold for a time sufficient to cure the resin and thereby form the head harness;

f) releasing the clamping pressure of the mold blocks; and g) removing the head harness from the mold.

The invention further relates to a respirator mask assembly comprising: (1) a facepiece having at least one inhalation port, inhalation valve, and inhalation filter suitable for removing contaminants from inhaled gases and vapors and having at least one exhalation port and exhalation valve for expelling exhaled gases from the facepiece; (2) a face seal supported by the facepiece; and (3) the novel head harness described above, with at least one of the second ends of the elastomeric fastening straps of the head harness being secured to the facepiece.

BRIEF DESCRIPTION OF THE DRAWING

The invention will be further explained with reference to the drawing. In the drawing:

FIGS. 1–3, which are idealized, are not to scale. FIGS. 2 and 3 are intended to be merely illustrative and non-limiting.

DETAILED DESCRIPTION OF ILLUSTRATIVE EMBODIMENTS

Figure 1:
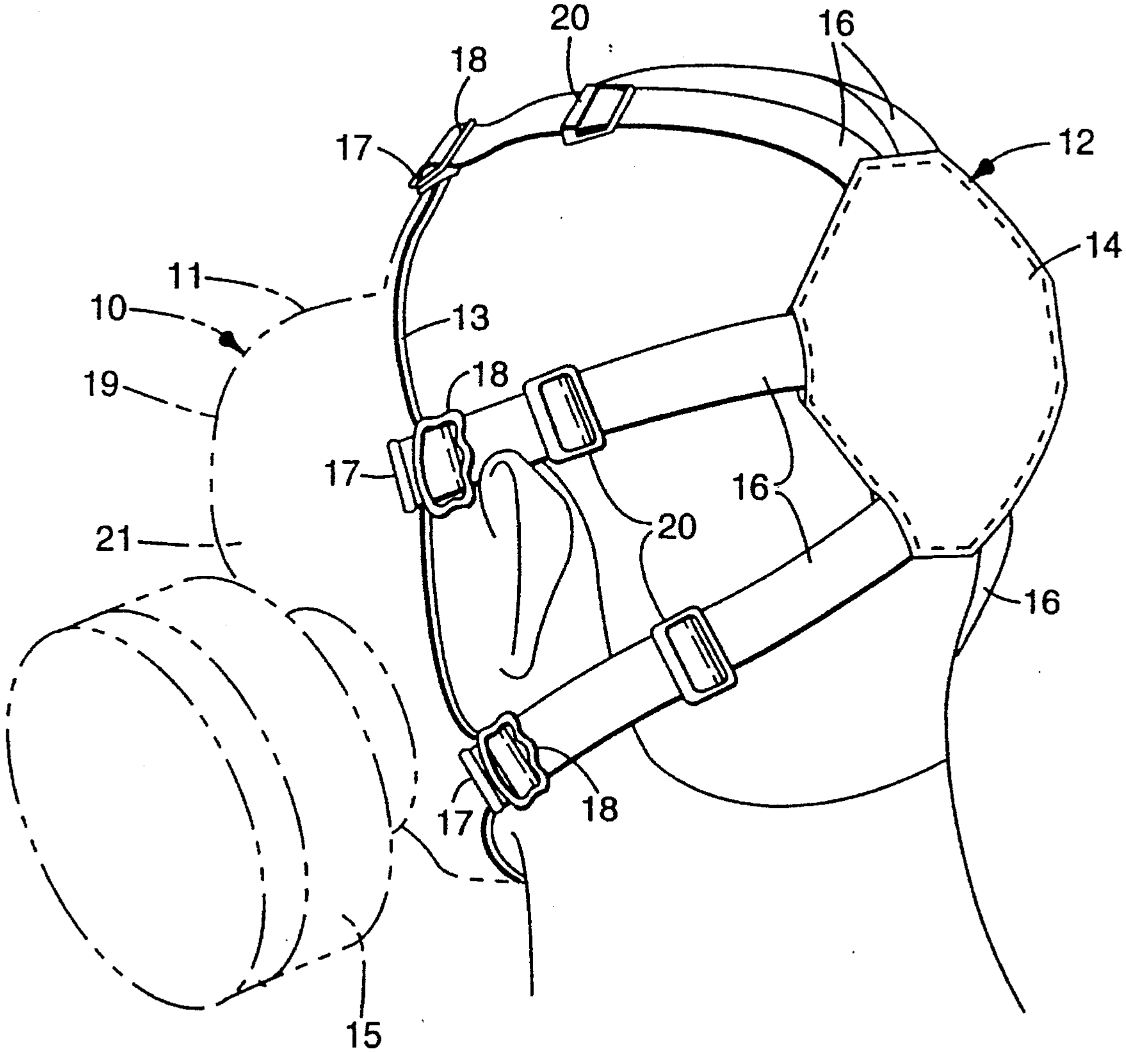
Fig. 1 PRIOR ART
FIG. 1 is a pictorial representation of a prior art head harness as it is worn.

Referring to the drawing, and in particular to FIG. 1, there is illustrated a respirator mask 10 attached to a prior art head harness 12. Although the respirator mask 10 shown is a full face mask, the respirator mask 10 could have any conventional design, i.e., the respirator mask 10 could be a full or half mask. The respirator mask 10 comprises a facepiece 11 and a flexible face seal 13 supported by the facepiece 11. The facepiece 11, which is typically rigid, includes a viewing lens 19 and a shell 21. Further, the respirator mask 10 includes at least one inhalation port (not shown), inhalation valve (not shown), and filter holder 15 fitted into the inhalation port for holding a filter (not shown) suitable for removing contaminants from inhaled gases and vapors. An exhalation port (not shown) and exhalation valve (not shown) are also provided for expelling exhaled gases from the facepiece.

The prior art head harness 12 comprises a pad 14 that is generally octagonal and six elastic straps 16 extending from the periphery of the pad. The straps 16 are connected to the respirator mask 10 at respective anchor points 17 distributed about the periphery of the mask. At the attachment points, the elastic straps 16 can be threaded through buckles 18, and their ends can be folded back to pass through secondary buckles 20 on the elastic straps.

Figure 2:
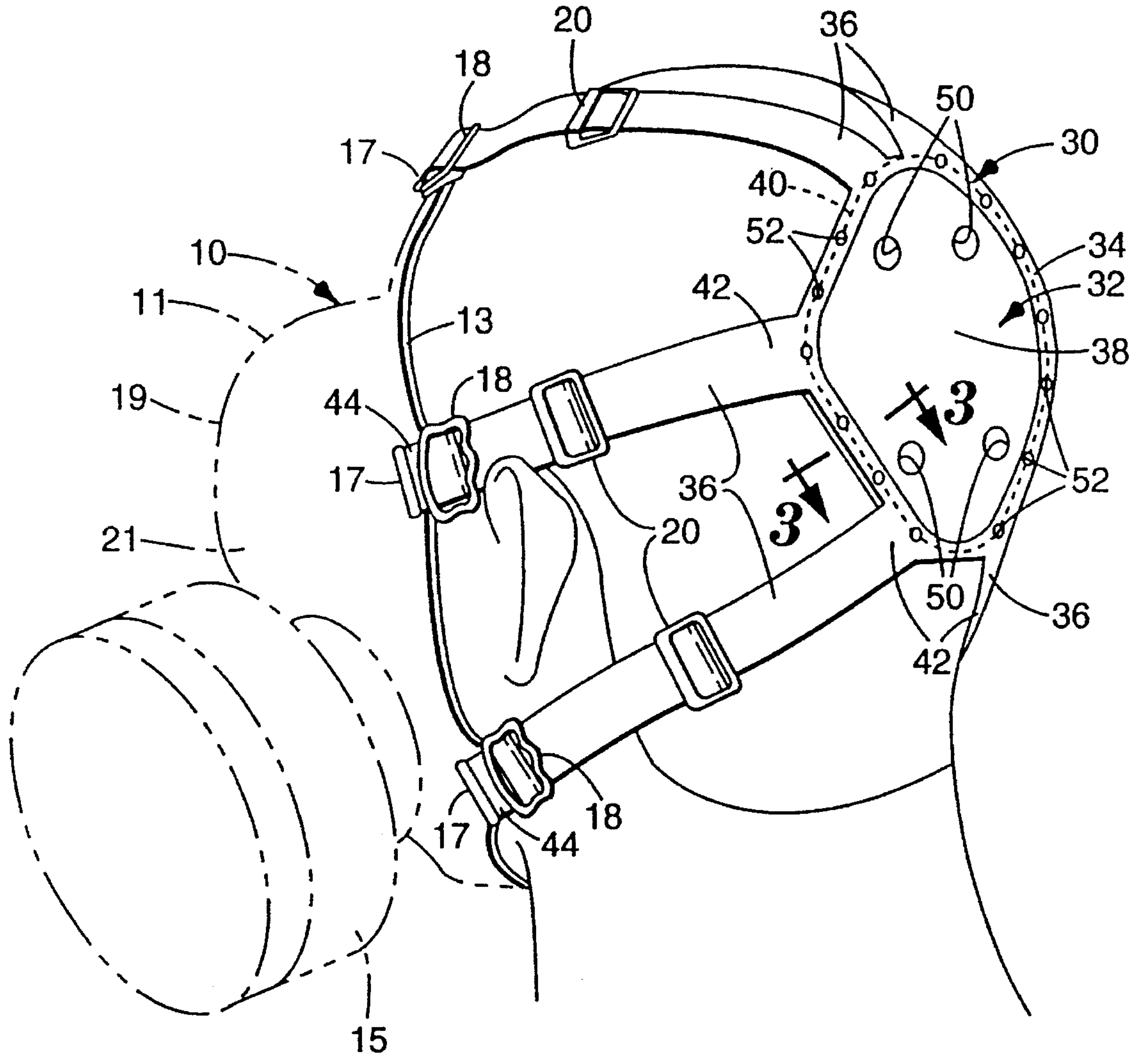
FIG. 2 is a pictorial representation of a head harness of the invention as the head harness is worn.
Figure 3:
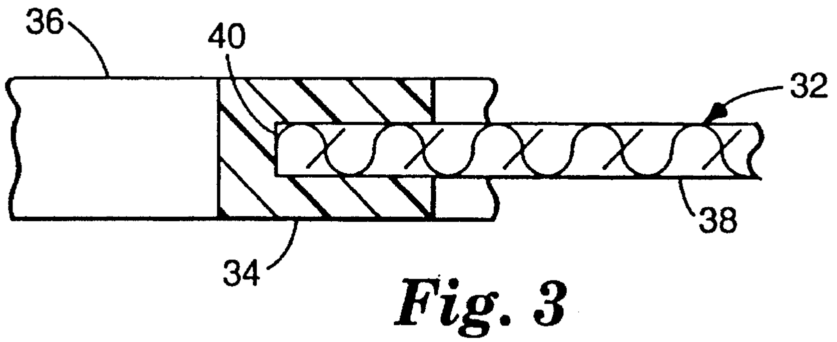
FIG. 3 is a schematic cross section of the head harness of the invention taken along the lines 3—3 of FIG. 2.

A head harness 30 according to a first embodiment of the invention is illustrated in FIGS. 2 and 3. The head harness 30 can be secured to a half face mask or a full face mask like the respirator mask 10. Referring to FIG. 2, the head harness 30 comprises a moldable web 32 comprising a central portion 38 and a peripheral portion 40 (see FIG. 3) extending at least partially, and preferably substantially completely, around the central portion 38. The term "peripheral portion 40" is intended to denote any portion of the web 32 which is to be contacted by molten resin during the molding process used in making the head harness 30, which process is described below.

The head harness 30 further comprises an elastomeric flange 34 comprising an elastomeric resin which embeds or encapsulates the peripheral portion 40 of the web 32. Thus, the elastomeric flange 34 is integrally bonded to the peripheral portion 40 of the web 32 as described in detail below. The head harness 30 further comprises a plurality (preferably 4, 5, or 6) of elastomeric fastening straps 36 comprising an elastomeric resin and having first ends 42 and second ends 44, the second ends 44 extending away from the elastomeric flange 34 for the purpose of securing a respirator mask like the respirator mask 10 to the head harness 30, thus permitting the respirator mask to be secured and maintained on a wearer's face. In contrast to prior art head harnesses, the elastomeric fastening straps 36 of the head harness 30 are integrally attached to the remainder of the head harness rather than being sewn. In other words, the first ends 42 are integrally bonded to the peripheral portion 40 of the web 32 through an integral bonding of the first ends 42 to the elastomeric flange 34 since the elastomeric flange 34 is integrally bonded to the peripheral portion 40 of the web 32. This integral construction is exceptionally strong and durable and permits the head harness 30 to be manufactured at a lower cost than prior art head harnesses.

The web 32 is moldable as stated above. In other words, since the web 32 is used as an insert in a molding process, it is important that the web 32 comprise a material which will not be unduly degraded by the molding process. The web 32 generally must not melt or be permanently deformed when subjected to the pressure and temperature of the molding process. Further, the peripheral portion 40 of the web 32 must comprise a material having a network of interstices which can be embedded in or encapsulated by the molten resin so that a mechanical bond can be formed between the molten resin and the web 32.

The peripheral portion 40 of the web 32 is preferably chemically compatible with the resin so that the peripheral portion 40 and the resin can more easily become integrally bonded. Since the peripheral portion 40 of the web 32 comprises a material having a network of interstices, the molten resin becomes mechanically bonded to the web 32 by penetrating the interstices, i.e., the material of the peripheral portion 40 becomes embedded in or encapsulated by the molten resin.

Preferably, the web 32 comprises a woven, knitted, or non-woven material such as a woven, knitted or non-woven fabric mesh of synthetic or natural material. Most preferred is a polypropylene or polyester fabric mesh. Further, the web 32 can comprise either stretch or non-stretch materials. If desired, the web 32 can comprise a polymeric resin such as a thermoplastic or thermoset resin mesh. Of course, the web 32 preferably comprises a low friction material which will permit the head harness 30 to be slid and placed over the wearer's head without becoming entangled with the wearer's hair. Typically, if the web 32 comprises a lightweight fabric mesh, e.g., a polypropylene or polyester fabric mesh, it will be possible to slide and place the head harness 30 over the wearer's head without the web 32 becoming entangled with the wearer's hair. Such a web would typically be more comfortable to wear than a web comprising a solid material because the fabric mesh permits the "dissipation" of heat and perspiration from the head of a wearer during use.

Referring to FIG. 3, the central portion 38 of the web 32 is not embedded in the elastomeric resin of the elastomeric flange 34 while the peripheral portion 40 of the web 32 is embedded in this resin. Thus, the elastomeric flange 34 comprises an elastomeric resin which embeds or encapsulates the peripheral portion 40 of the web 32 to thereby integrally bond the elastomeric flange 34 to the web 32. The elastomeric flange 34 certainly need not have a rectangular cross section as shown and can have various other shapes in cross section.

Incidentally, although the peripheral portion 40 is illustrated as lying generally in the middle of the elastomeric flange 34, the peripheral portion 40 need not be generally centered in the middle of the elastomeric flange 34 and need only be embedded at some location in the elastomeric flange 34. On the other hand, it is believed that a secure bond between the peripheral portion 40 of the web 32 and the resin of the elastomeric flange 34 can be ensured if the peripheral portion 40 is generally centered in the middle of the elastomeric flange 34. A manner in which this centering can be accomplished is described in detail below.

Also, the term "elastomeric fastening straps 36" as used herein is intended to include short elastomeric tabs which are not necessarily long enough to be effectively utilized in fitting a respirator mask to the face of a wearer. For instance, it is envisioned that the elastomeric fastening straps 36 could comprise relatively small elastomeric tabs having strap extensions secured to them through mechanical fasteners or adhesives. Such strap extensions would be adapted to extend away from the web 32 to a connection at the respirator mask. It is further envisioned that such strap extensions could also comprise a fabric which could be insert-molded to form an integral connection between the strap extensions and the strap tabs.

In an alternative embodiment of the invention, the elastomeric flange 34 could be eliminated and the first ends 42 of the elastomeric straps 36 could be directly integrally bonded to the peripheral portion 40 of the web 32 in the same manner that the elastomeric flange 34 is bonded to the peripheral portion 40 in the first embodiment described above.

Further, although the web 32 is illustrated in FIG. 2 as having a diamond shape, the web 32 can have other shapes as well. For example, the web 32 can alternatively have a circular, elliptical, rectangular, or oval shape.

The invention also relates to a process for making a head harness. Head harnesses of the invention like the head harness 30 are preferably produced at a single station in an insert-molding operation using an injection molding apparatus which includes a cavity block and a force block. Alternatively, it is contemplated that a compression molding, true transfer molding, or plunger molding operation could be utilized in making head harnesses of the invention. Preferably, the web 32 is a moldable fabric mesh and has a higher melting point than the resin which is to be inserted into the mold. A moldable polyester fabric mesh made by Apex Mill of Raritan, N.J. and sold under the trade designation PB-81 is presently preferred for use as the web 32.

The first step in the molding process involves inserting the web 32 into a mold which is adapted to receive the web 32 as an insert and having a mold cavity shaped to permit the molding of a plurality of elastomeric fastening straps 36 formed integrally with the peripheral portion 40 of the web 32. The cavity block and force block can also cooperate to define a cavity for forming the elastomeric flange 34.

Second, the web 32 is positioned and secured within the mold so that the peripheral portion 40 of the web 32 can extend into the mold cavity during the molding process. If desired, pins can be used in one mold block in combination with appropriately sized apertures 50 (see FIG. 2) in the central portion 38 of the web 32 and apertures in the opposing mold block adapted to receive the pins to ensure proper positioning and securing of the web 32 in the mold. For instance, during the first and second steps in the process, the web 32 can be placed and secured in the mold so that the apertures 50 of the web 32 snugly receive the pins.

After inserting and positioning the web 32 inside the mold, the force block is clamped against the cavity block, and a suitable clamping pressure is applied. Upon completion of this step, the central portion 38 of the web 32 is securely clamped between the surfaces of the cavity block and the force block, and the peripheral portion 40 of the web 32 extends into the cavity of the mold used to form the elastomeric flange 34. Because the central portion 38 of the web 32 is securely clamped between the surfaces of the cavity block and the force block, resin inserted into the mold during the molding process generally does not contact the central portion 38 of the web 32.

Further, if desired, a recess can be provided in a surface of the force block or cavity block for the purpose of housing an adhesive, such as a double sided pressure sensitive adhesive tape. The tape should be disposed so that it extends a small distance from the surface of the force block or cavity block so that it can be used in positioning and securing the web 32 inside the mold. Because the tape is recessed from the surface of the force block or cavity block, though, the undesired transfer of adhesive from the tape onto the material of the web 32 is prevented since the adhesive is not subjected to large pressures.

The peripheral portion 40 of the web 32 is then contacted with molten elastomeric resin in a quantity sufficient to embed the peripheral portion 40 of the web 32 and form the elastomeric fastening straps 36 which are integral with the peripheral portion 40 of the web 32. Preferably, the resin is injected into the mold cavity in an injection molding process. However, it is contemplated that other molding processes could be utilized such as a compression molding process wherein the elastomeric resin would be placed in a heated mold prior to clamping the blocks of the mold and wherein the resin would be softened and formed as a result of clamping the blocks of the mold together.

Irrespective of what molding process is utilized, the resin flows into the interstices between the uncompressed fibers of the peripheral portion 40 of the web 32 generally outside the area where the fibers of the central portion 38 of the web 32 are compressed by the surfaces of the force block and cavity block. The resin solidifies around the uncompressed fibers to thereby become bonded to the peripheral portion 40 of the web 32.

The peripheral portion 40 of the web 32 can be generally centered in the middle of the elastomeric flange 34 immediately prior to contacting the peripheral portion 40 with the resin by providing pins (these are different from the pins discussed above) in both the force block and cavity block. The pins of the force block and cavity block should act in pairs wherein each pin of a pair is positioned immediately across from the other pin of the pair in the opposing mold block. Upon clamping the mold blocks together, each pin extends into the mold cavity used in forming the elastomeric flange 34. Each pin should be aligned with its opposing pin in the opposing force block or cavity block. Each pair of pins should be adjusted such that the pins securely clamp the peripheral portion 40 of the web 32 between them when the mold blocks are clamped, thereby ensuring that the peripheral portion 40 of the web 32 will generally be embedded in a central portion of the elastomeric flange 34 as shown in FIG. 3. It is believed that optimal results can be achieved if several pairs of pins are positioned at appropriately spaced intervals along the mold cavity used in forming the elastomeric flange 34. Referring to FIG. 2, when these pins are utilized, apertures 52 are thereby formed in the elastomeric flange 34 during the molding process.

Next, suitable pressure and temperature are maintained in the mold for a time sufficient to cure the resin and thereby form the head harness 30. The last two steps in the process involve releasing the clamping pressure of the mold blocks and removing the molded head harness from the mold. As described above and shown in FIG. 3, the fibers of the peripheral portion 40 of the web 32 become encapsulated or embedded in the resin. In other words, the mold includes cavities which permit the fastening straps 36 to be integrally formed with the web 32, and thus, the head harness 30 is made as an integral article of manufacture. In contrast to prior art head harnesses, the fastening straps 36 of the head harness 30 are not sewn to the web 32. The head harness 30 is believed to have greater durability than prior art head harnesses because it is an integral unit. Further, it is believed that the head harness 30 can be manufactured at a lower cost than prior art head harnesses because no sewing operations are required and because the materials used in the head harness 30 are relatively inexpensive.

The resin inserted into the mold can be any moldable elastomeric resin, either thermoplastic or thermosetting, but preferably is a natural rubber or a synthetic thermoplastic elastomer, and most preferably is a synthetic thermoplastic elastomer. The Shell Chemical Company markets a series of suitable thermoplastic elastomer block copolymers known as KRATON™ D series thermoplastic elastomer block copolymers. Most preferably, the resin utilized herein comprises KRATON™ D2103, a styrene-butadiene-styrene block copolymer available from the Shell Chemical Company. Alternatively, other moldable resins such as ethylene propylene diene terpolymer (EPDM), neoprene, and silicone can be utilized to make the elastomeric flange 34 and the elastomeric fastening straps 36 of the head harness 30 if desired.

EXAMPLE

The invention will be further explained by the following illustrative example which is intended to be nonlimiting.

A head harness similar to the head harness 30 shown in the drawing was prepared using a water-cooled injection mold adapted to receive the web 32 as an insert. The web comprised an injection moldable polyester mesh made by Apex Mills of Raritan, N.J. and sold under the trade designation PB-81. The mold had a mold cavity shaped to permit the molding of an elastomeric flange like the elastomeric flange 34 and one elastomeric fastening strap like the fastening straps 36. The mold was mounted in a 300 ton (272,000 kg) horizontal reciprocating screw injection molding machine.

The web was inserted, positioned and secured in the mold so that the peripheral portion of the web could extend into the mold cavity during the molding process. The mold included a recess in the cavity block, and the recess housed a double sided adhesive tape which was used to position and secure the web within the mold.

Next, the blocks of the mold were clamped together at a suitable clamping pressure to thereby clamp the central portion of the web. As a result of the closing of the mold blocks, the peripheral portion of the web was also clamped by opposing pairs of pins disposed in the force block and cavity block so that the pins clamped or pinched the peripheral portion of the web between them.

Sixteen grams of a molten mixture of KRATON™ D2103, a styrene-butadiene-styrene block copolymer available from Shell Chemical Company, a general purpose crystalline polystyrene available from Amoco Corporation under the trade designation 61R5C7, and a grey colorant in a weight percent ratio of 10:0.5:0.3, respectively, was then injected into the mold cavity, the quantity injected being sufficient to embed the peripheral portion of the web (which extended completely around the central portion of the web) and form the elastomeric fastening strap. Suitable pressure and temperature were maintained in the mold for a time sufficient to cure the resin and thereby form a head harness similar to the head harness 30, except the head harness only had one elastomeric fastening strap. After the clamping pressure of the mold blocks was released, the mold was opened and the head harness removed from the mold.

Molding conditions were as follows:

| | |
|---|---|
| Temperatures | |
| Nozzle | 460° F. (238° C.) |
| Front Heater | 440° F. (227° C.) |
| Center Heater | 420° F. (216° C.) |
| Rear Heater | 400° F. (204° C.) |
| Mold | 150° F. (66° C.) |
| Cycle Conditions | |
| Boost Time | 2.0 sec. |
| Hold Time | 3.0 sec. |
| Mold Closed | 25 sec. |
| Mold Open | semi-automatic condition |
| Overall Cycle | 40 sec. |
| Setup Conditions | |
| Boost Pressure | 15,000 psi (1,034 bar) |
| Hold Pressure | 9,000 psi (620.5 bar) |
| Back Pressure | 50 psi (3.4 bar) |
| Screw Speed | 110 rpm |
| Injection Speed | 9.99 in/sec (25.4 cm/sec) |

The head harness obtained had a strong, integral connection between the elastomeric fastening strap, the elastomeric flange, and the web. The peripheral portion of the web was firmly embedded in the elastomeric resin of the elastomeric flange.

Various modifications and alterations of this invention will become apparent to those skilled in the art without departing from the scope and spirit of this invention.

What is claimed is:

1. A process for making a head harness which is adapted for use in securing a respirator mask to the face of a wearer, comprising the steps of:

a) inserting a moldable web into a mold, the web comprising a central portion and a peripheral portion extending at least partially around the central portion, the mold being adapted to receive the web as an insert and having a mold cavity shaped to permit the molding of a plurality of elastomeric fastening straps formed integrally with the peripheral portion of the web;

b) positioning and securing the web within the mold so that the peripheral portion of the web can extend into the mold cavity during the molding process;

c) clamping the blocks of the mold together at a suitable clamping pressure to thereby clamp the central portion of the web;

d) contacting the peripheral portion of the web with a molten elastomeric resin in a quantity sufficient to embed the peripheral portion of the web in the molten resin and form a plurality of elastomeric fastening straps which are integral with the peripheral portion of the web;

e) maintaining suitable pressure and temperature in the mold for a time sufficient to cure the resin and thereby form the head harness;

f) releasing the clamping pressure of the mold blocks; and g) removing the head harness from the mold.

2. The process of claim 1, further comprising the step of clamping the peripheral portion of the web immediately prior to contacting the peripheral portion with molten resin.

3. The process of claim 1 wherein the mold includes a recess in at least one of the block surfaces, and the recess houses an adhesive which is used during the fabric positioning and securing step to position and secure the web within the mold.

4. The process of claim 1 wherein the mold includes pins which are received in appropriately sized apertures of the web during the fabric positioning and securing step to thereby assist in positioning and securing the web within the mold.

5. The process of claim 1 wherein the web comprises a material selected from the group consisting of woven, knitted, and non-woven materials.

6. The process of claim 1 wherein the peripheral portion of the web extends substantially completely around the central portion of the web.

7. The process of claim 1 wherein the web comprises a fabric mesh selected from the group consisting of polypropylene fabric meshes and polyester fabric meshes.

8. The process of claim 1 wherein the elastomeric resin is selected from the group consisting of styrene-butadiene-styrene block copolymers, ethylene propylene diene terpolymer, neoprene, and silicone.

9. The process of claim 1 wherein the elastomeric resin comprises a styrene-butadiene-styrene block copolymer.

* * * * *